United States Patent
Abe et al.

(10) Patent No.: US 8,904,610 B2
(45) Date of Patent: Dec. 9, 2014

(54) METHOD FOR MANUFACTURING LAMINATED CERAMIC ELECTRONIC COMPONENT

(75) Inventors: Tomoro Abe, Echizen (JP); Hiroyuki Baba, Echizen (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 191 days.

(21) Appl. No.: 13/562,544

(22) Filed: Jul. 31, 2012

(65) Prior Publication Data

US 2012/0291270 A1 Nov. 22, 2012

Related U.S. Application Data

(63) Continuation of application No. 12/570,399, filed on Sep. 30, 2009, now Pat. No. 8,325,462.

(30) Foreign Application Priority Data

Oct. 3, 2008 (JP) .................................. 2008-258278

(51) Int. Cl.
*H01G 7/00* (2006.01)
*H01G 4/30* (2006.01)
*H01G 4/232* (2006.01)
*H01G 4/012* (2006.01)

(52) U.S. Cl.
CPC ................. *H01G 4/232* (2013.01); *H01G 4/30* (2013.01); *H01G 4/012* (2013.01)
USPC ...... 29/25.42; 29/25.41; 29/25.03; 361/321.2

(58) Field of Classification Search
CPC .......... H01G 4/005; H01G 4/232; H01G 4/30
USPC .......... 29/25.41–25.42, 825, 830–831, 592.1; 316/303, 311, 306.3, 321.1–321.2; 361/303, 311, 306.3, 321.1–321.2
See application file for complete search history.

(56) References Cited

U.S. PATENT DOCUMENTS

| | | | |
|---|---|---|---|
| 6,898,069 B2 * | 5/2005 | Yamaguchi et al. | 361/303 |
| 8,214,984 B2 * | 7/2012 | Bisplinghoff et al. | 29/25.42 |
| 8,320,101 B2 * | 11/2012 | Takeuchi et al. | 361/306.3 |
| 8,631,549 B2 * | 1/2014 | Motoki et al. | 29/25.42 |
| 2012/0291270 A1 * | 11/2012 | Abe et al. | 29/825 |

OTHER PUBLICATIONS

Abe et al.; "Laminated Ceramic Electronic Component and Method for Manufacturing the Same"; U.S. Appl. No. 12/570,399, filed Sep. 30, 2009.

* cited by examiner

*Primary Examiner* — Minh Trinh
(74) *Attorney, Agent, or Firm* — Keating & Bennett, LLP

(57) ABSTRACT

A method for manufacturing a laminated ceramic electronic component is provided in which a plurality of ceramic green sheets having printed strip inner electrodes patterns, each including a thick portion at a width-direction center and thin portions at respective width-direction sides of the thick portion, are laminated so that the thin portions overlap and the thick portions do not overlap to form an unfired mother laminated body. This unfired mother laminated body is cut along predetermined cut lines that are vertical to each other to obtain a plurality of unfired ceramic element assemblies. By applying ceramic paste to cover exposed portions of inner electrode patterns exposed to lateral surfaces, side gap areas are formed between a first inner electrode pattern and first and second lateral surfaces of the unfired ceramic element assembly and between a second inner electrode pattern and the first and second lateral surfaces.

2 Claims, 14 Drawing Sheets

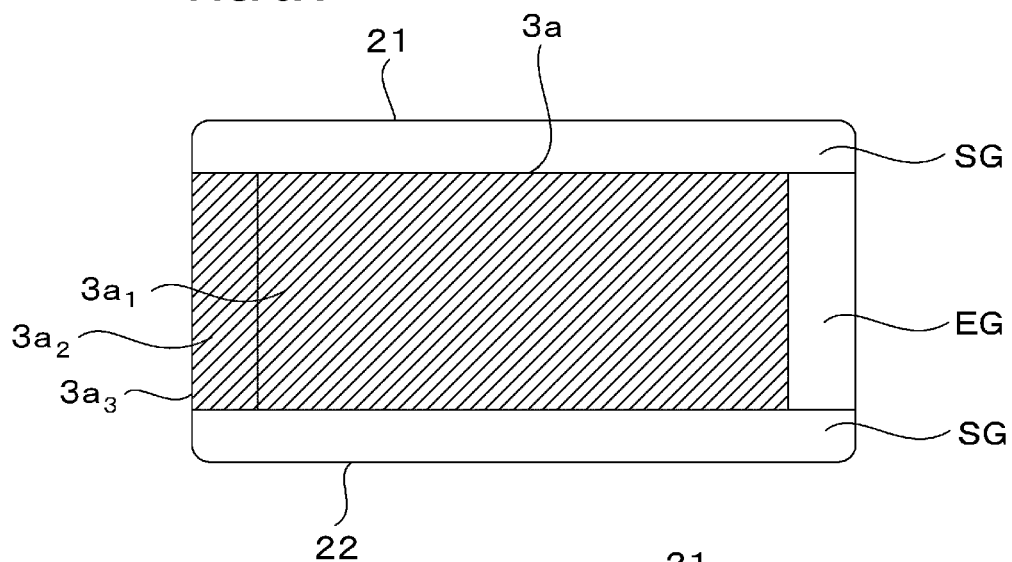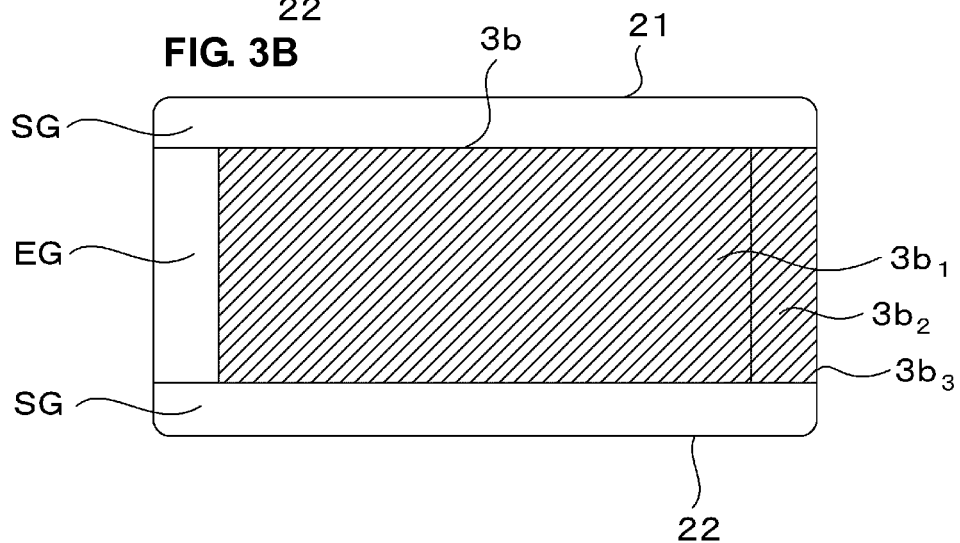

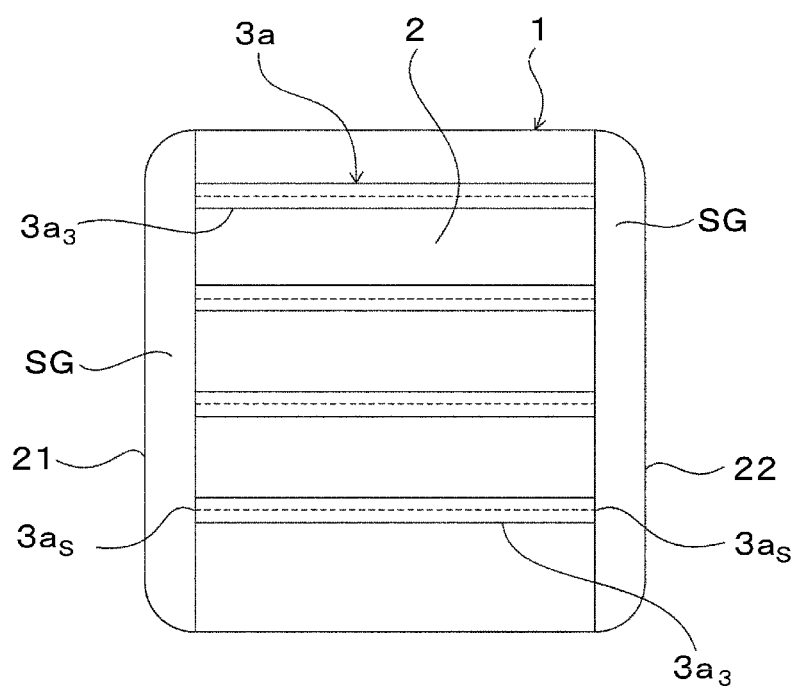

METHOD FOR MANUFACTURING LAMINATED CERAMIC ELECTRONIC COMPONENT

BACKGROUND OF THE INVENTION

1. Field of the Invention

The present invention relates generally to ceramic electronic components, and, more particularly, to a laminated ceramic electronic component formed by laminating ceramic layers and inner electrodes and a method for manufacturing the same.

2. Description of the Related Art

Recently, a market for mobile electronic devices, such as mobile phones, notebook personal computers, digital cameras, and digital audio devices, has been expanding. As these mobile electronic devices have been downsized and equipped with advanced functions, a demand for miniaturization and function enhancement of many laminated ceramic electronic components included in the mobile electronic devices is increasing. For example, there is a demand for miniaturization and larger capacitance of monolithic ceramic capacitors included in these mobile electronic devices.

To meet this demand, ceramic layers of the monolithic ceramic capacitors are being made thinner and the number of laminated ceramic layers tends to increase.

In general, at the time of manufacturing of a laminated ceramic electronic component, inner electrode patterns are printed on ceramic green sheets that serve as ceramic layers after firing to form inner-electrode-pattern arranged sheets. The inner-electrode-pattern arranged sheets are then laminated so that the inner electrode patterns on the sheets adjacent to each other in the lamination direction are in a predetermined positional relationship. The resulting mother block is cut at predetermined positions to obtain unfired ceramic element assemblies (raw chips). Generally, this ceramic element assembly has a structure in which a plurality of inner electrode patterns are arranged to face each other through unfired ceramic layers (ceramic green sheets) and one ends of the plurality of inner electrode patterns are alternately led out to opposite end surfaces of the ceramic element assembly.

Regarding the shape of the obtained unfired ceramic element assembly (raw chip), a center portion where the inner electrode patterns face each other through the ceramic layers tends to be relatively thick, whereas both end portions to which the inner electrode patterns are led out tend to be relatively thin. As the number of laminated ceramic green sheets increases, this tendency becomes more obvious. This phenomenon is caused by accumulated steps on the ceramic green sheets between a printed area with the printed inner electrodes patterns and a gap area without the inner electrode patterns.

There are following two main problems caused by the steps.

One is a problem regarding delamination (peeling) of ceramic layers that constitute the ceramic element assembly, which may undesirably reduce reliability of products.

The other is a problem regarding a mounting failure. Flatness of an upper surface of the chip is lost and holing of the chip using a sucking chuck undesirably becomes unstable.

To avoid this situation, a method for manufacturing a laminated ceramic electronic component that cancels a step of a gap area (hereinafter, also referred to as an "end gap area") in a ceramic-layer longitudinal direction (direction along an inner-electrode led out direction) by increasing thickness of led-out parts of the inner electrodes has been suggested (see Japanese Unexamined Patent Application Publication No. 11-26279).

FIG. 11 is a sectional view showing a laminated ceramic electronic component manufactured using this method according to the related art. The laminated ceramic electronic component includes a ceramic element assembly 51 formed of a plurality of laminated ceramic layers 52, first inner electrodes 53a and second inner electrodes 53b that are formed inside of the ceramic element assembly 51, and a first outer terminal electrode 55a and a second outer terminal electrode 55b that are formed at end surfaces 54a and 54b of the ceramic element assembly 51, respectively. The inner electrodes 53a and 53b have effective parts $53a_1$ and $53b_1$ for obtaining a predetermined electric characteristic and led-out parts $53a_2$ and $53b_2$ led out from the effective parts to the end surfaces 54a and 54b of the ceramic element assembly 51, respectively. Thicknesses of the led-out parts $53a_2$ and $53b_2$ of the inner electrodes 53a and 53b are thicker than those of the effective parts $53a_1$ and $53b_1$, respectively.

FIG. 12 is a diagram showing a process for manufacturing a laminated ceramic electronic component according to the related art. FIG. 12 shows a state where a plurality of inner electrode patterns 63 are printed on a ceramic green sheet 60.

In the example shown in FIG. 12, the plurality of inner electrode patterns 63 each of which forms two inner electrodes when a mother block resulting from lamination is cut, namely, inner electrode patterns 63 each including two inner electrodes, are printed in a matrix on a surface of the ceramic green sheet 60 with center parts thereof (areas serving as the led-out parts after cutting) 63a being made thicker as shown in FIG. 12. In FIG. 12, cut lines are denoted by dotted lines D1 and D2. Here, a vertical-direction cut line extending vertical to the inner-electrode led-out direction is denoted by D1, whereas a horizontal-direction cut line that is parallel to the inner-electrode led-out direction and is vertical to the cut line D1 is denoted by D2.

In the related art, the ceramic green sheets 60 shown in FIG. 12 are laminated while alternately shifting the ceramic green sheets 60 in the direction parallel to the cut line D2 by one pitch of the cut line D1 to form a mother laminated body.

FIG. 13 is a schematic sectional view along the cut line D1 of the ceramic green sheet 60 shown in FIG. 12. As shown in FIG. 13, since each inner electrode pattern 63 is printed at predetermined intervals in the method according to the related art, a saddle phenomenon is caused, in which rising areas (elevated areas) 64 are formed near the periphery of each inner electrode pattern 63. As shown in FIG. 14, since the degree of rising of the rising areas 64 at ends of exposed parts of the inner electrode patterns 63 increases particularly in the design for thickening the led-out part of the inner electrodes, ceramic layers are more likely to peel off at the both ends of the exposed parts of the inner electrodes in a ceramic element assembly resulting from lamination, cutting, and firing of the ceramic green sheets having the inner electrode patterns formed thereon or a step is generated again because the rising areas accumulated in the lamination direction. As a result, reliability of products undesirably drops. Additionally, each side 63a extending in the ceramic-layer lamination direction located at the respective end of the exposed part of the inner electrode patterns 63 is not parallel to a lateral surface S of the ceramic element assembly but gaps are more likely to be formed between the neighboring ceramic layers. In that respect, the reliability is undesirably low.

SUMMARY OF THE INVENTION

In view of the above-described problems, preferred embodiments of the present invention provide a laminated ceramic electronic component that is free from delamination (peeling of ceramic layers) and a reliability decrease caused by a step between an inner-electrode arranged area and other areas.

A method for manufacturing a laminated ceramic electronic component according to a preferred embodiment of the present invention is a method for manufacturing a laminated ceramic electronic component having a structure in which inner electrodes are arranged in a ceramic element assembly to face each other through a ceramic layer, are led out to a predetermined end surface of a pair of facing end surfaces of the ceramic element assembly, and are connected to outer electrodes formed on the pair of end surfaces. The method includes a) preparing a plurality of ceramic green sheets on which one or more strip inner electrode patterns each having a predetermined width and a predetermined length are printed, the strip inner electrode pattern including a thick portion that is located substantially at the center of the width direction and is relatively thicker along the length direction and thin portions that are located at respective width-direction sides of the thick portion and are thinner than the thick portion along the length direction, b) laminating the plurality of ceramic green sheets so that the thin portions overlap and the thick portions do not overlap to form an unfired mother laminated body, and c) cutting the unfired mother laminated body along a first cut line that is parallel or substantially parallel to the length direction and passes through the thick portion and a second cut line that is vertical to the first cut line to obtain a plurality of unfired ceramic element assemblies. Each of the unfired ceramic element assemblies obtained at STEP c) has a first principal surface and a second principal surface that face each other, a first lateral surface and a second lateral surface that are formed to face each other by cutting along the second cut line, and a first end surface and a second end surface that are formed to face each other by cutting along the first cut line. Each of the unfired ceramic element assemblies has a structure in which the thick portions of first and second inner electrode patterns are led out to the first and second end surfaces, respectively, and the thick portions and the thin portions of the first and second inner electrode patterns are exposed to each of the first and second lateral surfaces.

The method further includes applying ceramic paste on the first and second lateral surfaces of the unfired ceramic element assembly to cover exposed portions of the inner electrode patterns that are exposed to the respective lateral surfaces to form side gap areas between the first inner electrode pattern and the first lateral surface of the unfired ceramic element assembly, between the first inner electrode pattern and the second lateral surface, between the second inner electrode pattern and the first lateral surface, and between the second inner electrode pattern and the second lateral surface.

A laminated ceramic electronic component according to another preferred embodiment of the present invention includes a ceramic element assembly that is formed of a plurality of laminated ceramic layers and has a first principal surface and a second principal surface that face each other, a first lateral surface and a second lateral surface that face each other, and a first end surface and a second end surface that face each other, a first inner electrode that is formed in the ceramic element assembly and has a first effective portion, a first led-out portion led out to the first end surface from the first effective portion, and a first exposed portion located at an end of the first led-out portion and exposed to the first end surface, a second inner electrode that is formed in the ceramic element assembly and has a second effective portion, a second led-out portion led out to the second end surface from the second effective portion, and a second exposed portion located at an end of the second led-out portion and exposed to the second end surface, a first outer terminal electrode formed on the first end surface to cover the first exposed portion, and a second outer terminal electrode formed on the second end surface to cover the second exposed portion. The first and second led-out portions are thicker than the first and second effective portions, respectively. Sides that are located at respective ends of the first exposed portion and extend in the ceramic-layer lamination direction are substantially in parallel to the first and second lateral surfaces. Sides that are located at respective ends of the second exposed portion and extend in the ceramic-layer lamination direction are substantially in parallel to the first and second lateral surfaces.

Preferably, the first exposed portion may be formed to linearly extend in parallel to the ceramic layers at the first end surface or ends of the first exposed portion may be formed to tilt at a small angle with respect of a principal surface of the ceramic layers near the first and second lateral surfaces. Preferably, the second exposed portion may be formed to linearly extend in parallel to the ceramic layers at the second end surface or ends of the second exposed portion may be formed to tilt at a small angle with respect of a principal surface of the ceramic layers near the first and second lateral surfaces.

In a method for manufacturing a laminated ceramic electronic component according to a preferred embodiment of the present invention, the plurality of ceramic green sheets having a printed strip inner electrode pattern, each of which has a predetermined width and a predetermined length and includes a thick portion that is located substantially at the center of the width direction and is made relatively thicker along the length direction and thin portions that are located at respective width-direction sides of the thick portion and are made thinner than the thick portion along the length direction, are laminated so that the thin portions overlap and thick portions do not overlap to form an unfired mother laminated body. This unfired mother laminated body is cut along a first cut line that is parallel to the length direction and passes through each thick portion and a second cut line that is vertical to the first cut line to obtain a plurality of unfired ceramic element assemblies. As a result, it is possible to efficiently form unfired ceramic element assemblies, each of which has first and second facing principal surfaces, first and second facing lateral surfaces formed by cutting along the second cut line, and first and second facing end surfaces formed by cutting along the first cut line, and has a structure in which the thick portions of first and second inner electrode patterns are led out to the first and second end surfaces, respectively.

As described above, since the led-out portion of inner electrode patterns is made thicker in a preferred embodiment of the present invention, density at the led-out portion of the inner electrode patterns of the unfired ceramic element assembly that has less inner electrode pattern layers than an effective portion can be brought closer to density at the effective portion. As a result, variance in pressure applied when the unfired mother laminated body is press-bonded can be suppressed and occurrence of delamination can be efficiently prevented.

Furthermore, since the mother laminated body is cut along the first and second cut lines to obtain the unfired ceramic element assemblies, the strip inner electrode patterns are also cut along the cut lines. Accordingly, when conductive paste is printed in a predetermined pattern, it is possible to obtain the unfired ceramic element assembly having inner electrode patterns without rising portions resulting from a so-called saddle phenomenon near periphery portions.

By firing the unfired ceramic element assembly, it is possible to obtain a fired ceramic element assembly that does not have a step between an inner-electrode arranged area and other areas and advantageously has principal-surface flatness.

Accordingly, a preferred embodiment of the present invention provides a laminated ceramic electronic component that can suppress and prevent the occurrence of delamination and is free from a reliability decreases due to the step between the inner-electrode arranged area and the other areas to be efficiently manufactured.

Additionally, ceramic paste is applied onto the first and second lateral surfaces of the unfired ceramic element assembly to cover the exposed portions of the inner electrode patterns exposed to the lateral surfaces to form side gap areas between the first inner electrode pattern and the first and second lateral surfaces of the unfired ceramic element assembly and between the second inner electrode pattern and the first and second lateral surfaces. With such a configuration, it is possible to efficiently manufacture a highly reliable laminated ceramic electronic component having the side gap areas.

As described above, in the laminated ceramic electronic component according to a preferred embodiment of the present invention, the sides that are located at respective ends of the first exposed portion and extend in the ceramic-layer lamination direction are substantially in parallel to the first and second lateral surfaces, whereas the sides that are located at respective ends of the second exposed portion and extend in the ceramic-layer lamination direction are substantially in parallel to the first and second lateral surfaces of the ceramic element assembly. The led-out portions of the inner electrode patterns to the first and second end surfaces are made thicker than the effective portions. Accordingly, it is possible to provide a laminated ceramic electronic component that can prevent occurrence of delamination and is free from a reliability decrease due to the step between the inner-electrode arranged area and the other areas.

Such a laminated ceramic electronic component can be efficiently manufactured, for example, using the above-described method for manufacturing a laminated ceramic electronic component according to a preferred embodiment of the present invention. In this case, it is possible to provide a laminated ceramic electronic component that includes inner electrodes not having rising portions resulting from a so-called saddle phenomenon at periphery portions and that is free from a reliability decreases due to delamination and the step between the inner-electrode arranged area and the other areas.

When the sides at the respective ends of the exposed portion of the inner electrode extending in the ceramic-layer lamination direction are formed to be substantially in parallel to the first and second lateral surfaces of the ceramic element assembly, gaps are less likely to be generated between neighboring ceramics compared to a case where the sides at the respective ends of the exposed portion of the inner electrode extending in the ceramic-layer lamination direction are not in parallel to the lateral surfaces of the ceramic element assembly (see FIG. 14), which is generally seen in inner electrodes having rising periphery portions due to the saddle phenomenon. In this regard, the occurrence of delamination can be prevented.

Preferably, the inner electrodes are formed so that the first and second exposed portions linearly extend in parallel to the ceramic layers at the first and second end surfaces. However, when the ends thereof are formed to tilt at a small angle with respect to the principal surface of the ceramic layers near the first and second lateral surfaces, advantages substantially equivalent to those obtained when the inner electrodes are formed to linearly extend can be obtained. More specifically, when the first and second lateral surfaces are formed by cutting the mother laminated body using a cutting-blade press-cutting method, inner electrodes may tilt to some extent near the lateral surfaces. In such a case, advantages similar to those obtained when the inner electrodes linearly extend can be obtained.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIGS. 3A and 3B are exploded plan views of a major portion of a monolithic ceramic capacitor shown in FIG. 1 and show a configuration of a pair of inner electrodes facing each other through a ceramic layer.

FIG. 4 is a diagram showing an end surface of a ceramic element assembly that constitutes a monolithic ceramic capacitor before outer electrodes are formed.

DETAILED DESCRIPTION OF THE PREFERRED EMBODIMENTS

Features of the present invention will be described in detail below by showing preferred embodiments of the present invention.

Preferred Embodiment 1

Figure 1:
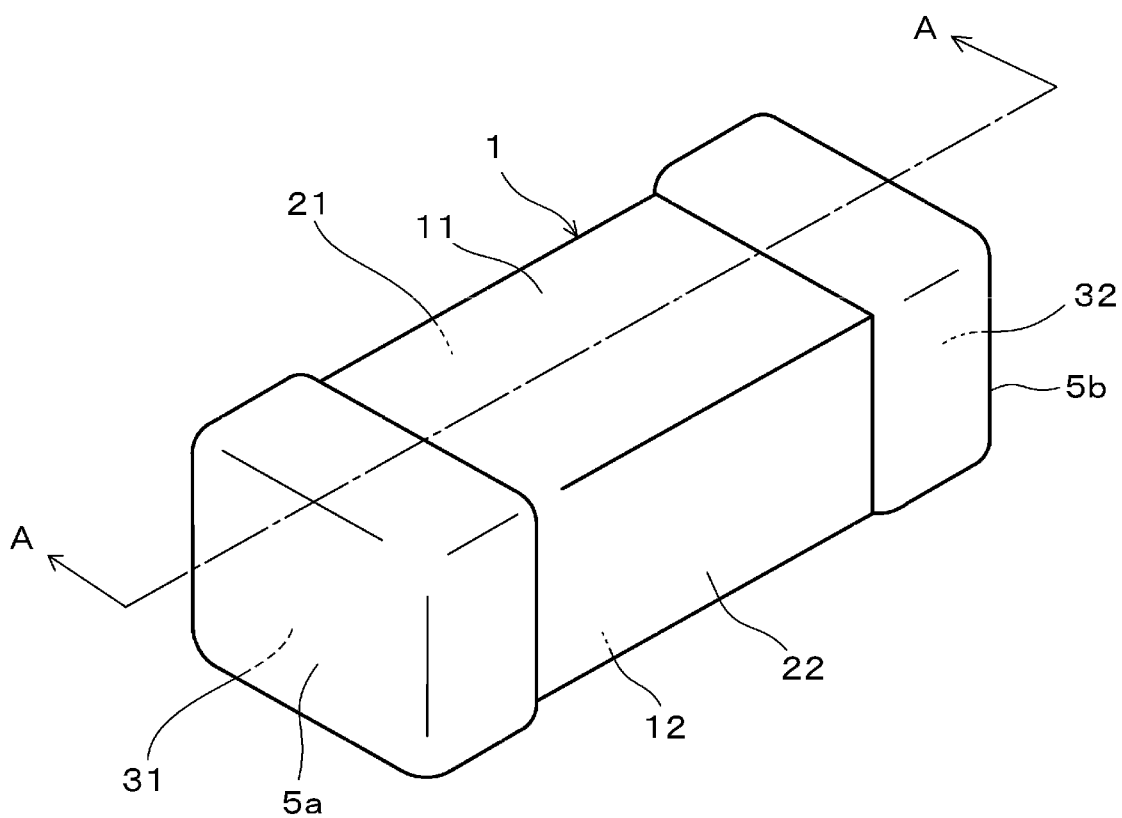
FIG. 1 is a perspective view showing a laminated ceramic electronic component (monolithic ceramic capacitor) according to a preferred embodiment of the present invention.
Figure 2:
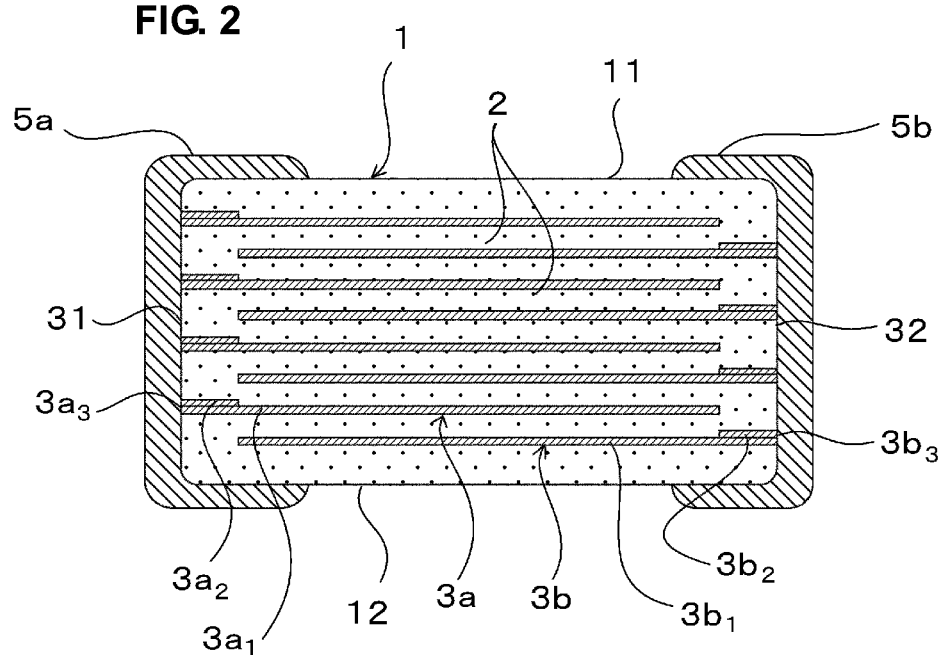
FIG. 2 is a sectional view taken from Line A-A of FIG. 1.
Figure 5A:
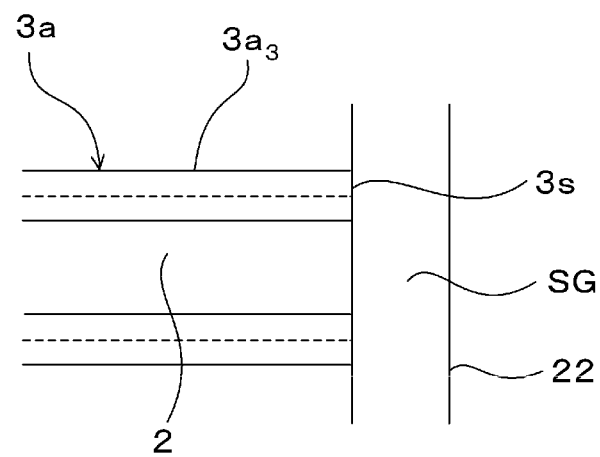
FIGS. 5A and 5B are schematic enlarged sectional views showing a portion shown in FIG. 4.
Figure 5B:
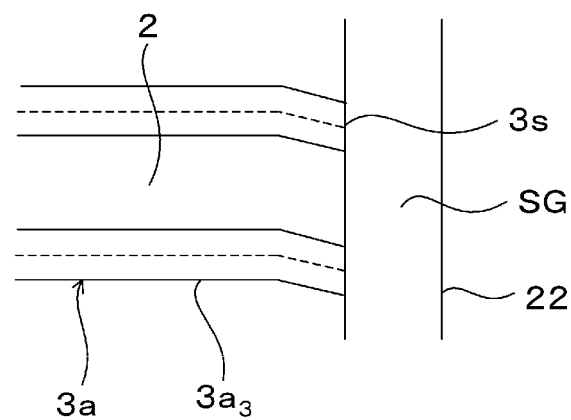

FIG. 1 is a perspective view showing a laminated ceramic electronic component (a monolithic ceramic capacitor in this preferred embodiment) according to a preferred embodiment of the present invention. FIG. 2 is a sectional view taken from Line A-A of FIG. 1. FIGS. 3A and 3B are exploded plan views of a major portion of the monolithic ceramic capacitor shown in FIG. 1. FIG. 4 is a diagram showing an end surface of a ceramic element assembly that constitutes the monolithic ceramic capacitor. FIGS. 5A and 5B are schematic enlarged sectional views showing a portion shown in FIG. 4.

As shown in FIGS. 1 to 5B, this laminated ceramic electronic component (monolithic ceramic capacitor) includes a ceramic element assembly 1. The ceramic element assembly 1 is formed of a plurality of laminated ceramic layers 2, each of which is made of dielectric ceramic. The ceramic element assembly 1 has first and second principal surfaces 11 and 12 that face each other, first and second lateral surfaces 21 and 22 that face each other, and first and second end surfaces 31 and 32 that face each other, respectively.

The ceramic element assembly 1 also includes first inner electrodes 3a and second inner electrodes 3b therein. The first inner electrode 3a has a first effective portion $3a_1$, a first led-out portion $3a_2$ that is led out to the first end surface 31 from the first effective portion $3a_1$, and a first exposed portion $3a_3$ that is located at an end of the first led-out portion $3a_2$ and is exposed to the first end surface 31. The second inner electrode 3b has a second effective portion $3b_1$, a second led-out portion $3b_2$ that is led out to the second end surface 32 from the second effective portion $3b_1$, and a second exposed portion $3b_3$ that is located at an end of the second led-out portion $3b_2$ and is exposed to the second end surface 32.

Furthermore, a first outer terminal electrode 5a formed on the first end surface 31 of the ceramic element assembly 1 to cover the first exposed portion $3a_3$ of the first inner electrode 3a and a second outer terminal electrode 5b formed on the second end surface 32 of the ceramic element assembly 1 to cover the second exposed portion $3b_3$ of the second inner electrode 3b are also included.

In this monolithic ceramic capacitor, the first led-out portion $3a_2$ is thicker than the first effective portion $3a_1$, whereas the second led-out portion $3b_2$ is thicker than the second effective portion $3b_1$ (see FIG. 2). The first and second led-out portions $3a_2$ and $3b_2$ of the first and second inner electrodes 3a and 3b, respectively, are formed to be thicker than other areas by applying conductive paste twice. FIGS. 4, 5A, and 5B show that the first led-out portion $3a_2$ (exposed portion $3a_3$) has a double layer structure, in which a boundary is represented by a dotted line.

As shown in FIGS. 4, 5A, and 5B, sides $3a_s$ that are located at respective ends of the first exposed portion $3a_3$ and extend in the lamination direction of the ceramic layers 2 are substantially in parallel to the first and second lateral surfaces 21 and 22, respectively. Although not shown, sides that are located at respective ends of the second exposed portion and extend in the lamination direction of the ceramic layers 2 are also substantially in parallel to the first and second lateral surfaces.

In this preferred embodiment 1, the first and second inner electrodes 3a and 3b are formed so that the first and second exposed portions $3a_3$ and $3b_3$ extend substantially linearly in parallel to the ceramic layers 2, respectively.

The first and second exposed portions $3a_3$ and $3b_3$ may be formed so that ends thereof are tilted near the first and second lateral surfaces 21 and 22 at a small angle with respect to the principal surfaces of the ceramic layers 2.

FIGS. 4 and 5A show a state where the first exposed portion $3a_3$ extends substantially linearly in parallel to the ceramic layers 2, whereas FIG. 5B shows a state where an end of the first exposed portion $3a_3$ is formed to tilt at a small angle with respect to a principal surface of the ceramic layers 2.

As shown in FIGS. 3A and 3B, this laminated ceramic electronic component has end gap areas EG that are located between the first inner electrode 3a and the second end surface 32 and between the second inner electrode 3b and the first end surface 31, and side gap areas SG that are located between the first inner electrode 3a and the first lateral surface 21 and between the first inner electrode 3a and the second lateral surface 22, or between the second inner electrode 3b and the first lateral surface 21 and between the second inner electrode 3b and the second lateral surface 22.

A detail of each element, component or portion constituting the monolithic ceramic capacitor according to the preferred embodiment 1 is as follows.

Ceramic Layer

Dielectric ceramic containing, for example, $BatiO_3$, $CaTiO_3$, $SrTiO_3$, and $CaZrO_3$ as main components may be used as a material of the ceramic layer 2 that constitutes the monolithic ceramic capacitor according to the preferred embodiment 1. Materials containing Mn-compounds, Fe-compounds, Cr-compounds, Co-compounds, and Ni-compounds as well as these main components may also be used.

In addition, piezoelectric ceramic, such as PZT ceramic, and semiconductor ceramic, such as spinel ceramic, may be used.

The monolithic ceramic capacitor is formed using dielectric ceramic as the material of the ceramic layers in this preferred embodiment 1. However, for example, when piezoelectric ceramic is used as the material of the ceramic layers, a piezoelectric component is obtained. When a semiconductor ceramic is used, a laminated ceramic electronic component functioning as a thermistor can be obtained.

Preferably, thickness of the ceramic layer (after firing) may be generally in a range of approximately 0.1-10 μm, for example.

Inner Electrodes

For example, Ni, Cu, Ag, Pd, Au, or alloy thereof can be used as a material of the inner electrode.

Preferably, thickness of the effective portion of the inner electrode (after firing) may be approximately 0.1-2.0 μm, for example.

On the other hand, the led-out portion of the inner electrode is preferably approximately 1.5-2.5 times as thick as that of the effective portion. Generally, the thickness of the led-out portion may preferably be approximately 0.15-5.0 μm, for example.

Outer Terminal Electrode

A structure in which a metal-plating film is formed on a thick-film conductor serving as a substrate can be adopted as the outer terminal electrode.

The thick-film conductor may be formed at the same time of firing of the ceramic element assembly or may be baked after firing of the ceramic element assembly. For example, one kind of metal selected from a group consisting of Cu, Ni, Ag, and Pd or alloy containing the metal can be used as a material of the thick-film conductor. Preferably, thickness of the thick-film conductor may preferably be approximately 10-50 μm, for example.

For example, one kind of metal selected from a group consisting of Cu, Ni, Sn, Pb, Au, Ag, Pd, Bi, and Zn or ally containing the metal can be used as a material of the metal-plating film. The metal-plating film may have a multilayer structure. Preferably, thickness of one metal-plating film may preferably be approximately 1-15 μm, for example.

A method for manufacturing the monolithic ceramic capacitor according to the preferred embodiment 1 will now be described.

First, ceramic green sheets, inner-electrode conductive paste, and outer-terminal-electrode conductive paste are prepared. Although the ceramic green sheets and the conductive paste include binder and solvent, known organic binder and known organic solvent can be used as the binder and the solvent, respectively.

Figure 6:
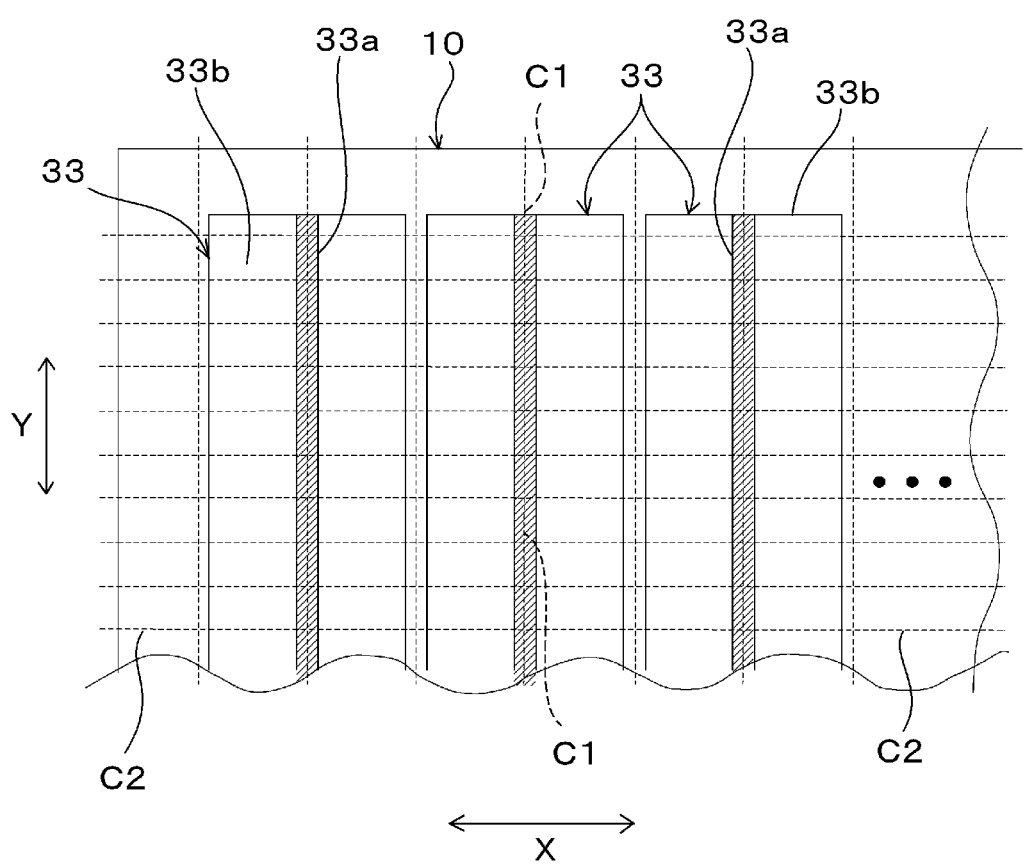
FIG. 6 is a diagram showing a state where strip inner electrode patterns are printed on a ceramic green sheet at a step of a method for manufacturing a laminated ceramic electronic component according to a preferred embodiment of the present invention.

As shown in FIG. 6, the conductive paste in a predetermined pattern is then printed on a ceramic green sheet 10 using screen printing to form strip inner electrode patterns 33 and led-out-part thick portions 33a that are thicker than other areas (effective-part thin portions 33b).

More specifically, this strip inner electrode pattern 33 has the following structure. When the strip inner electrode pattern 33 is viewed in the led-out direction of the inner electrodes 3a and 3b (see FIGS. 2-3B) of the monolithic ceramic capacitor, two inner electrodes are formed. When the strip inner electrode pattern 33 is viewed in the direction vertical to the led-out direction, a plurality of inner electrodes are formed in the laminated ceramic electronic component. The led-out portion ($3a_2$ or $3b_2$) of the inner electrode that is located at the center of the led-out direction of the inner electrode (see FIGS. 2-3B) after the strip inner electrode pattern 33 is divided into ceramic element assemblies is made thicker.

To form the strip inner electrode pattern 33, the conductive paste may be printed in an X-direction (horizontal direction) or a Y-direction (vertical direction) shown in the drawing.

According to a preferred embodiment of the present invention, strip inner electrode patterns each including a plurality of inner electrode patterns are printed on each ceramic green sheet and the plurality of inner electrode patterns are formed by cutting the laminated ceramic green sheets instead of separately printing the inner electrode patterns like the related art. Accordingly, each of the divided inner electrode patterns does not have a rising portion caused by a saddle phenomenon and a highly reliable laminated ceramic electronic component can be obtained.

Figure 7:
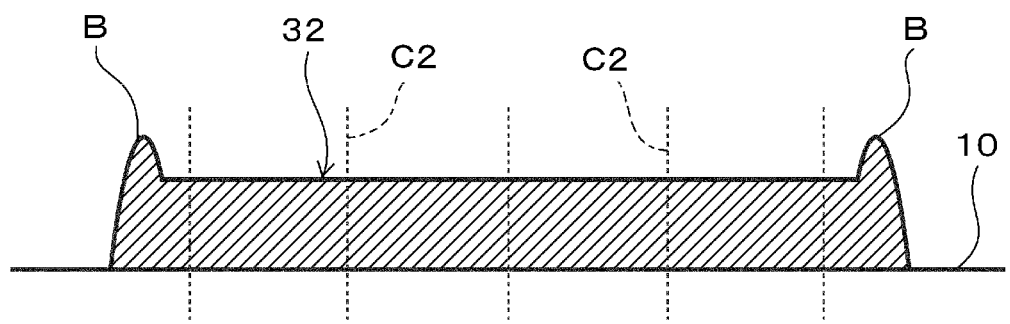
FIG. 7 is a diagram showing a state where a strip inner electrode pattern is cut at a first cut line that passes through thick portions and the section is viewed from a direction parallel to a second cut line.

More specifically, the rising portion due to the saddle phenomenon is more likely to be caused near peripheral areas of a printed pattern, namely, a print starting area and a print end area. For example, when the conductive paste is printed in the Y-direction shown in FIG. 6 to form the strip inner electrode patterns, manufacturing of defective products can be prevented by cutting and discarding rising portions B (FIG. 7) caused at upper and lower ends in FIG. 6 (left and right ends in FIG. 7) even if the rising portions are caused.

Figure 8:
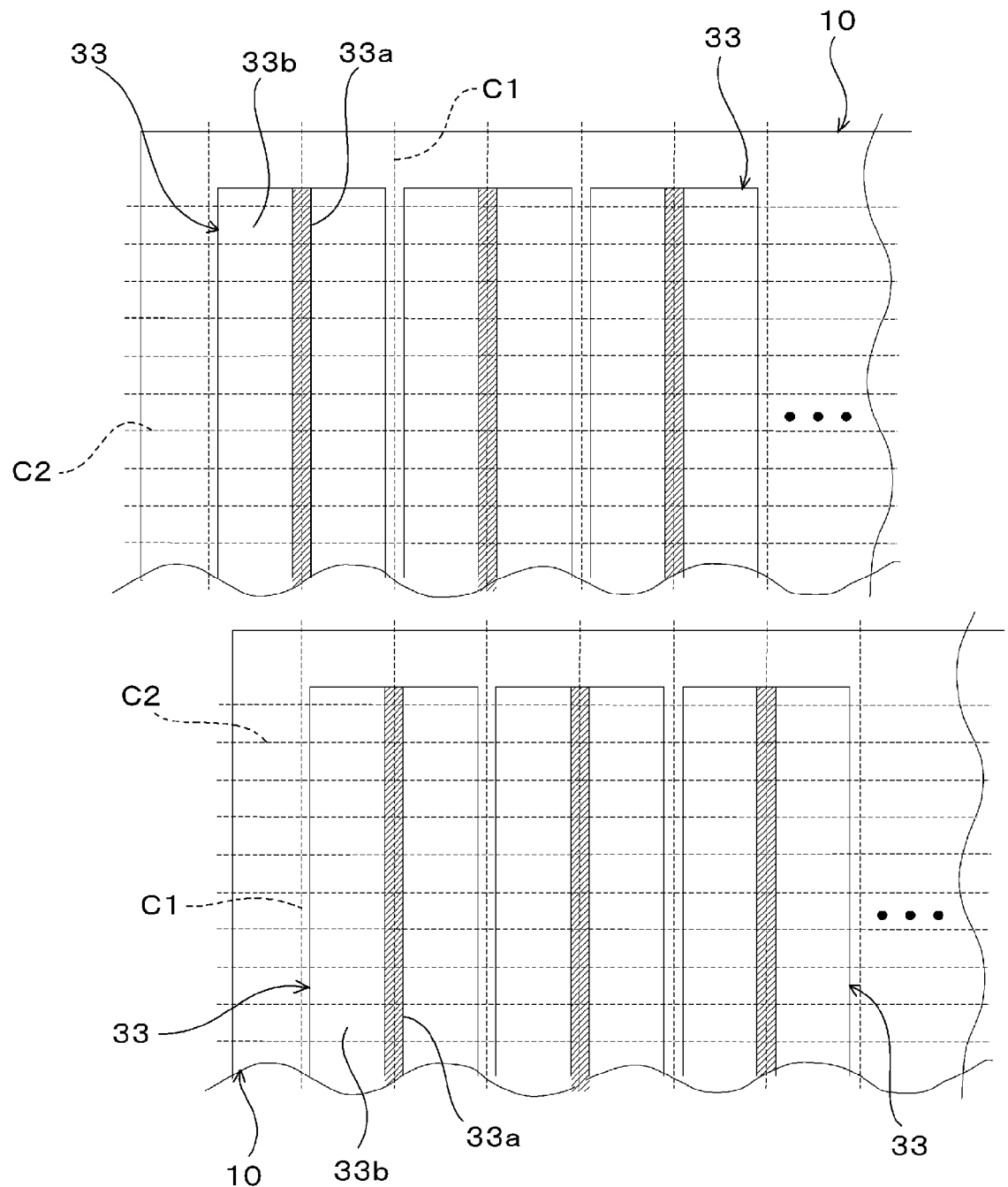
FIG. 8 is a diagram showing a method for laminating ceramic green sheets having strip inner electrode patterns printed thereon while shifting positions of the ceramic green sheets.

As shown in FIG. 8, a predetermined number of the ceramic green sheets 10 having strip inner electrode patterns 33 printed thereon are laminated while alternately shifting the ceramic green sheets 10 by one pitch of the first cut line C1. More specifically, the ceramic green sheets 10 having the strip inner electrode patterns 33 printed thereon are laminated while alternately shifting the ceramic green sheets 10 in the led-out direction of the inner electrodes and the opposite direction by a distance corresponding to one ceramic element assembly.

Furthermore, a plurality of outer-layer ceramic green sheets without the printed inner electrode patterns are laminated on the upper and lower surfaces to manufacture an unfired mother laminated body (mother block). The unfired mother laminated body is press-bonded in the lamination direction by a hydrostatic pressure press or the like if necessary.

Figure 9:
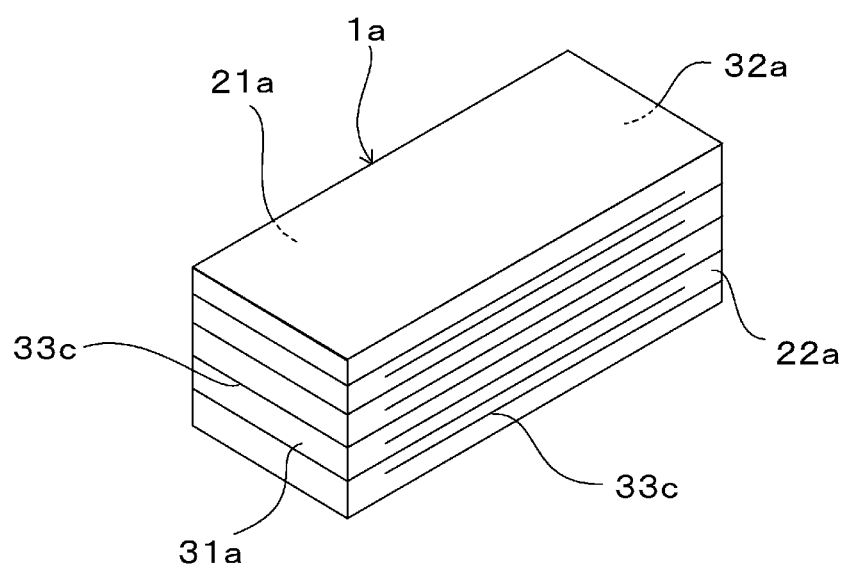
FIG. 9 is a perspective view showing an unfired ceramic element assembly manufactured at a step of a method for manufacturing a laminated ceramic electronic component according to a preferred embodiment of the present invention with inner electrode patterns thereof being exposed to a lateral surface and an end surface.

The unfired mother laminated body is cut along the cut lines C1 and C2 to obtain unfired ceramic element assemblies (raw chips) in a predetermined size. In this manner, as shown in FIG. 9, an unfired ceramic element assembly 1a having inner electrode patterns 33c exposed to lateral surfaces 21a and 22a and end surfaces 31a and 32a is obtained.

Figure 10:
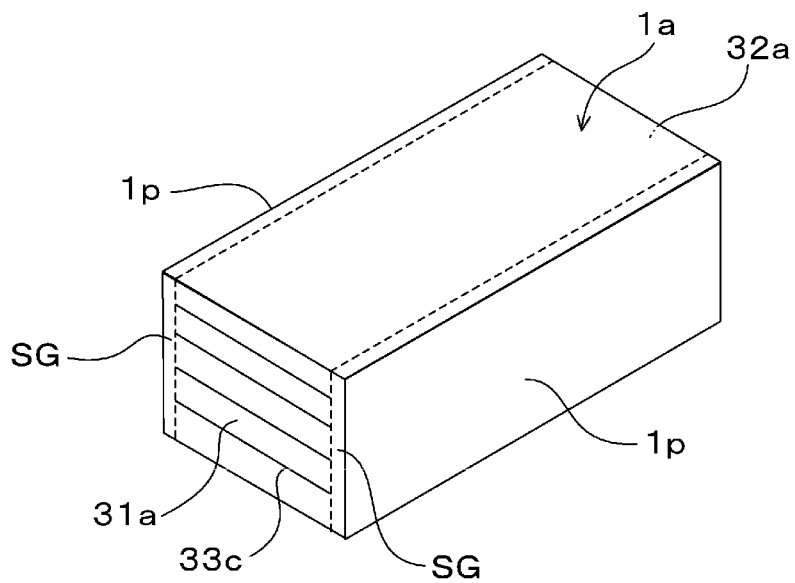
FIG. 10 is a perspective view showing a state where side gap areas are formed by applying ceramic paste onto a lateral surface of an unfired ceramic element assembly shown in FIG. 9.
Figure 11:
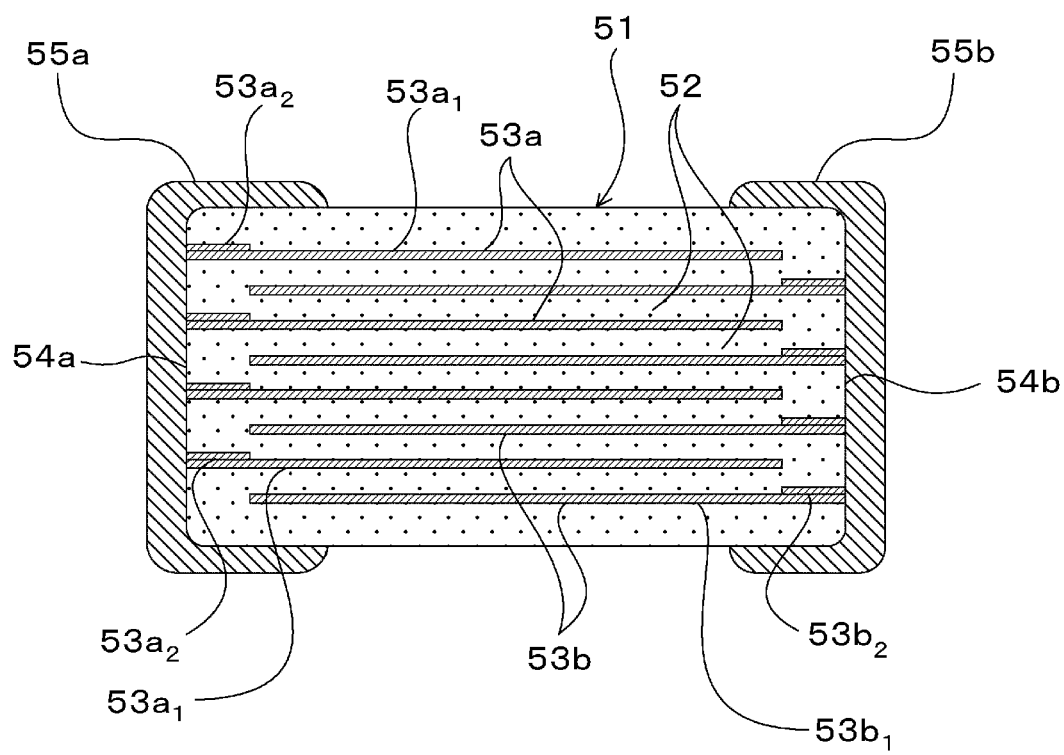
FIG. 11 is a sectional view showing a laminated ceramic electronic component according to the related art.
Figure 12:
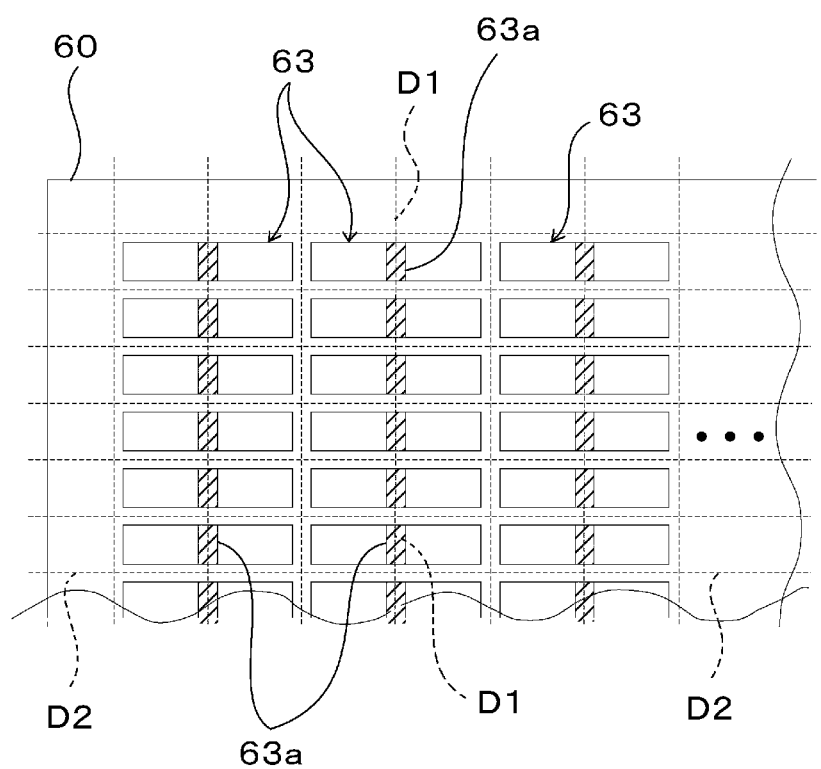
FIG. 12 is a diagram showing a ceramic green sheet having inner electrode patterns formed in a process of manufacturing a laminated ceramic electronic component according to the related art.
Figure 13:
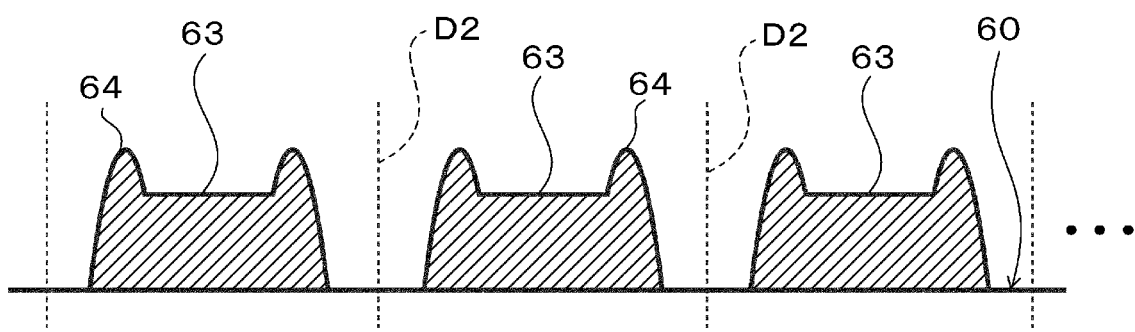
FIG. 13 is a schematic sectional view taken along a cut line D1 of a ceramic green sheet shown in FIG. 12.
Figure 14:
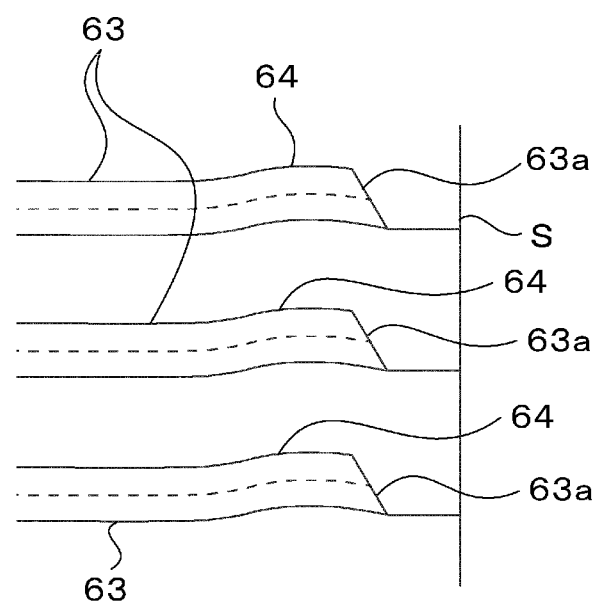
FIG. 14 is a diagram that illustrates problems involving a method for manufacturing a laminated ceramic electronic component according to the related art and shows a state where the rising degree at an end of an exposed portion of an inner electrode pattern is large.

As shown in FIG. 10, ceramic paste 1p is then applied onto the lateral surfaces 21a and 22a of the unfired ceramic element assembly 1a to cover the exposed inner electrode patterns 33c. The applied ceramic paste 1p constitutes the side gap areas SG (see FIGS. 3A and 3B) located between the inner electrode pattern 33c and the first and second lateral surfaces 21a and 22a of the unfired ceramic element assembly 1a. Preferably, the same ceramic material as that contained in the ceramic green sheet may be used as a ceramic material contained in the ceramic paste used here. The end gap areas EG (see FIGS. 3A and 3B) located between ends of the inner electrode patterns and the first and second end surfaces 31a and 32a are formed when the unfired mother laminated body is cut in accordance with a positional relationship between the strip inner electrode patterns 33 and the cut line C1.

The unfired ceramic element assembly 1a having the ceramic paste 1p applied onto the lateral surface 21a in the above-described step is fired under a predetermined conduction. Although firing temperature depends on materials of the ceramic and the inner electrodes, the firing temperature may preferably be approximately 900-1300° C., for example.

Grinding processing, such as barrel grinding, is then performed on the fired ceramic element assembly (capacitor main body) 1 if necessary to expose the exposed portions $3a_3$ and $3b_3$ of the inner electrodes 3a and 3b to the end surfaces 31 and 32, respectively (see FIG. 2). At this time, edges and corners of the ceramic element assembly 1 are dulled.

By applying and firing the outer-terminal-electrode conductive paste onto the end surfaces 31 and 32 of the ceramic element assembly 1, the thick-film conductor serving as a substrate is then formed. Preferably, firing temperature may be approximately 700-900° C., for example.

One or more metal-plating layers (e.g., Ni-film and Sn-film) are then formed on the thick-film conductor if necessary.

In this manner, the monolithic ceramic capacitor having the structure shown in FIGS. 1-5B is obtained.

As described above, the unfired mother laminated body is formed by laminating the strip-inner-electrode-pattern arranged ceramic green sheets. The unfired ceramic element assemblies of the monolithic ceramic capacitor according to this preferred embodiment are formed by cutting the unfired mother laminated body. Accordingly, the inner electrodes do not have rising portions caused due to the saddle phenomenon. Additionally, sides of the inner electrodes located at respective ends of the exposed portions exposed to the end surfaces of the ceramic element assembly are substantially in parallel to the lateral surfaces of the ceramic element assembly. As a result, it is possible to obtain a laminated ceramic electronic component that is free from delamination and a reliability decrease resulting from a step caused between an area having the inner electrodes and other areas.

Although the description has been given for the monolithic ceramic capacitor as an example in the preferred embodiment 1, the present invention is not limitedly applied to the monolithic ceramic capacitor but can be applied to a laminated ceramic piezoelectric component using piezoelectric ceramic and a thermistor using semiconductor ceramic.

The present invention is not limited to the above-described preferred embodiment with regard to other respects and various applications and modifications can be made regarding arrangement of the strip inner electrode patterns on the ceramic green sheets, the number of laminated ceramic green sheets, the lamination state of the ceramic green sheets, and the side-gap-area forming method within the scope of the present invention.

As described above, it is possible to efficiently manufacture a laminated ceramic electronic component that is free from delamination and a step caused between an area having inner electrodes and other areas according to a preferred embodiment of the present invention. Accordingly, the present invention can be suitably applied to laminated ceramic electronic components, such as a monolithic ceramic capacitor, a laminated ceramic piezoelectric component, and a laminated thermistor, for various applications and to methods for manufacturing the same.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for manufacturing a laminated ceramic electronic component, the laminated ceramic electronic component having a structure in which inner electrodes are arranged in a ceramic element assembly to face each other through a ceramic layer, are led out to a predetermined end surface of a pair of facing end surfaces of the ceramic element assembly, and are connected to outer electrodes formed on the pair of end surfaces, the method comprising:
   a) preparing a plurality of ceramic green sheets on which one or more strip inner electrode patterns each having a predetermined width and a predetermined length are printed, the strip inner electrode pattern including a thick portion that is located substantially at a central portion of the width direction and is relatively thicker along the length direction and thin portions that are located at respective width-direction sides of the thick portion and are thinner than the thick portion along the length direction;
   b) laminating the plurality of ceramic green sheets so that the thin portions overlap and the thick portions do not overlap to form an unfired mother laminated body; and
   c) cutting the unfired mother laminated body along a first cut line that is parallel or substantially parallel to the length direction and passes through the thick portion and a second cut line that is vertical to the first cut line to obtain a plurality of unfired ceramic element assemblies; wherein
   each of the unfired ceramic element assemblies obtained from the step c has a first principal surface and a second principal surface that face each other, a first lateral surface and a second lateral surface that are formed to face each other by cutting along the second cut line, and a first end surface and a second end surface that are formed to face each other by cutting along the first cut line; and
   each of the unfired ceramic element assemblies has a structure in which the thick portions of first and second inner electrode patterns are led out to the first and second end surfaces, respectively, and the thick portions and the thin portions of the first and second inner electrode patterns are exposed to each of the first and second lateral surfaces.

2. The method according to claim 1, further comprising: applying ceramic paste on the first and second lateral surfaces of the unfired ceramic element assembly to cover exposed portions of the inner electrode patterns that are exposed to the respective lateral surfaces to form side gap areas between the first inner electrode pattern and the first lateral surface of the unfired ceramic element assembly, between the first inner electrode pattern and the second lateral surface, between the second inner electrode pattern and the first lateral surface, and between the second inner electrode pattern and the second lateral surface.

* * * * *